United States Patent Office 3,064,014
Patented Nov. 13, 1962

3,064,014
6-METHYL-19-NOR-STEROIDS
Hendrik Paul de Jongh and Stefan Antoni Szpilfogel, Oss, Netherlands, assignors to Organon Inc., West Orange, N.J., a corporation of New Jersey
No Drawing. Filed Aug. 8, 1960, Ser. No. 47,960
Claims priority, application Netherlands Aug. 17, 1959
6 Claims. (Cl. 260—397.5)

The invention relates to a process for the preparation of new in 17-position substittued $\Delta^4$-19-norsteroids, non-oxygenated in 3-position.

More particularly it relates to the preparation of new compounds of the general formula:

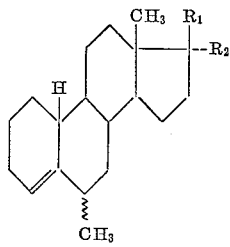

in which
$R_1$ represents a hydroxyl or an acyloxy group,
$R_2$ hydrogen or a saturated or unsaturated aliphatic hydrocarbon radical with 1–4 carbon atoms, or
$R_1$ and $R_2$ together form a keto group, by splitting off the 3-keto group of a $\Delta^4$-3-keto-6-methyl-19-nor-androstene compound substituted in 17-position by a hydroxyl- or acyloxy group and a hydrogen atom, or by a hydroxyl or acyloxy group and an aliphatic hydrocarbon radical, and, if required, by introducing before or after this splitting off, by methods known per se, the substituents stated in the formula in 17-position.

The $\Delta^4$-3-keto-6-methyl-19-nor-androstene compounds to be used as starting products in the present process are described in the Belgian Patent No. 582,830.

The 3-keto group may be split off in different manners. It is possible for example to convert the 3-keto compound by one of the known methods into a 3-thioketal and subsequently split off the 3-thioketal group by reaction of this compound with an alkali metal in the presence of liquid ammonia.

The thioketalisation of the 3-keto group can take place by condensation of the 3-keto-steroid with a thiol or dithiol in the presence of zinc chloride or hydrochloric acid and a dehydrating agent, such as sodium sulphate. It is also possible to prepare the desired 3-thioketals by an exchange reaction or by reaction with a thiol or dithiol in the presence of p-toluene sulphonic acid and of a water insoluble organic solvent. The water formed during the reaction is removed. Another possibility is that the 3-keto-steroid, preferably dissolved in glacial acetic acid, is reacted with the SH-compound in question in the presence of a Lewis-acid, preferably boron trifluoride.

A summary of the well-known thioketalisation reactions is given by L. F. Fieser in J. Am. Chem. Soc. 76, pages 1945–1947 (1954).

The 3-keto group is preferably converted into a cyclic thioketal, for example, by means of ethane dithiol, propane dithiol or butane dithiol, but also non-cyclic thioketals, for example, those derived from ethyl thiol, propyl thiol, thiophenol or benzyl thiol, can be used as intermediate products in the present process.

The thus prepared $\Delta^4$-6-methyl-19-nor-3-thioketal-steroid is subsequently reacted with an alkali metal in the presence of liquid ammonia, when the 3-thioketal-steroid is reduced and a $\Delta^4$-19-nor-steroid compound non-oxygenated in 3-position is obtained. Said reduction is usually carried out in the presence of a suitable solvent, such as an aliphatic ether, dioxane or tetra-hydrofuran.

The alkali metal used in this reaction may be, for example, lithium, sodium or potassium. Preferably sodium is used.

The 3-keto group may also be split off by means of one of the methods described in the Netherlands Patents No. 91,082, and No. 91,086. These processes are characterized in that the $\Delta^4$-3-keto-steroid is reduced to the corresponding 3-hydroxy compound, which group is then etherified or esterified, after which the etherified or esterified hydroxyl group present in 3-position is split off.

The reduction of the 3-keto group can be carried out by means of one of the usual reducing agents, such as an alkali metal borohydride, an alkali metal aluminum hydride, an alkali metal trialkoxy borohydride or aluminum isopropoxide in isopropanol.

The etherification or esterification of the 3-hydroxyl group following hereafter can be carried out in any known manner.

The 3-substituent is split off by reacting the compound in question with an alkali metal in the presence of liquid ammonia or an aliphatic primary amine. This reaction is usually carried out in the presence of a suitable solvent, such as an aliphatic ether, dioxane or tetra hydrofuran.

The 3-substituent is preferably split off by converting it into a 3-thioketal group and splitting this off by reacting the 3-thioketal steroid with an alkali metal in the presence of liquid ammonia.

The steroid compounds to be used as starting products in splitting off the 3-keto group may already have been substituted in 17-position by a hydroxyl group and an aliphatic hydrocarbon radical with 1–4 carbon atoms. This hydrocarbon radical may be saturated or contain one or two double bonds. If the hydrocarbon radical contains a triple bond, this will also be reduced in the reduction methods described above. In order to obtain an in 3-position non-oxygenated steroid compound, substituted in 17-position by a triple unsaturated hydrocarbon radical, such as an ethynyl- or butynyl group, it will therefore be necessary to introduce this group after splitting off the 3-substituent.

It is also possible to introduce the saturated hydrocarbon radical or the hydrocarbon radical containing one double bond present in the desired final products in 17-position after splitting off the 3-substituent, for example, by starting from the $\Delta^4$-3-keto-6-methyl-17-hydroxy-19-nor-androstene, splitting the 3-keto group off this compound by means of one of the processes described above, subsequently oxidizing the 17-hydroxy group into a keto group and finally by converting this compound into the desired 17-alkyl-derivative by an alkylating reaction.

The saturated or unsaturated aliphatic hydrocarbon radical present in the final products in 17-position is, for example, a methyl-, ethyl-, propyl-, isopropyl, butyl-, vinyl-, propenyl-, allyl-, methallyl-, ethynyl-, propynyl-, or butynyl radical.

If desired, the 17-hydroxy steroids prepared in accordance with the processes described above may be esterified with a saturated or unsaturated carboxylic acid, in which particularly the acids with long carbon chains are of importance to obtain esters with prolonged action. Preferably carboxylic acids with 1–30 carbon atoms are used.

As examples of acids to be used are mentioned: formic acid, acetic acid, propionic acid, butyric acid, valeric acid, caproic acid, capryllic acid, capric acid, undecylic acid, lauric acid, tridecylic acid, myristic acid, pentadecylic acid, oleic acid, palmitic acid, stearic acid, arachic acid, behenic acid, lignoceric acid, cerotic acid, mentanic acid, myricinic acid, trimethyl acetic acid, diethyl acetic acid, hexahydrobenzoic acid, cyclopentyl propionic acid, cyclohexyl propionic acid, cyclohexyl butyric acid, citronelic acid, undecylenic acid, erucic acid, benzoic acid, phenyl acetic acid, phenyl propionic acid, phenyl butyric acid, phenyl propiolic acid, succinic acid, glutaric acid, pimelic acid, tartaric acid, carbamic acid, glycine and alanine.

The preparation of these esters can take place by any method known per se by reacting the 17-hydroxy steroid with the acid in question, or the anhydride or the halide thereof.

When a steroid compound substituted in 17-position by a hydroxyl group and a hydrogen atom has been taken as starting material, this compound may after the 3-keto-group has been split off, be oxidized into the corresponding 17-keto compound by one of the usual methods. This compound possesses as such biological activity, but may also be used for the preparation of the corresponding 17-hydroxy-17-alkyl-steroids.

In the present process both a 6α- and a 6β-methyl-steroid can be taken as starting product. The 6α-methyl-steroids are the most important on account of their biological activity.

The compounds according to the invention possess progestative, anabolic, androgenic, gonad-inhibiting and pregnancy-maintaining properties.

The following examples illustrate the invention.

Example I

After cooling in ice water 2.71 ml. of ethane dithiol and 1.76 ml. of boron trifluoride-etherate are added to a solution of 5.4 g. of 6-methyl-19-nor-testosterone in 25 ml. acetic acid. The solution is kept at room temperature for two hours, after which water is added. The aqueous mixture is then extracted with chloroform, the chloroform layer is separated, washed with a saturated sodium bicarbonate solution in water and after that with water until neutral. The chloroform solution is then dried with sodium sulphate and finally evaporated to dryness in vacuo. The residue is recrystallised from ethanol to obtain 4.82 g. of the 3-ethylene thioketal of 6-methyl-19-nor-testosterone; melting point 162–163.5° C.

Of this compound 4.82 g. are dissolved in 32 ml. of tetra hydrofuran, after which this mixture is added while stirring to a solution of 2.75 g. of sodium in 160 ml. of liquid ammonia. The reaction mixture is stirred for 15 minutes, after which 15 ml. of absolute ethanol are added. The ammonia is evaporated, 250 ml. of water are added and the aqueous mixture is extracted with methylene chloride. The extract is washed with 50 ml. of 2 N hydrochloric acid and then with water until neutral. The solution is dried with sodium sulphate and then evaporated to dryness. The residue is recrystallised from hexane to obtain 3.5 g. $\Delta^4$-6-methyl-17β-hydroxy-19-nor-androstene; melting-point 80–80.5° C. and $[\alpha]_D = +33.5°$ (in chloroform).

To a solution of 1 g. of this compound in 8 ml. of pyridine 1.9 g. of acetic acid anhydride are added, after which this solution is stirred at 35° C. for 6 hours. Then 20 ml. of water are added, after that the mixture is stirred for two hours and finally, after adding 100 ml. of water, extracted with ether. The ether extract is washed with 2 N hydrochloric acid, then with 1 N sodium hydroxide, then dried with sodium sulphate and finally evaporated to dryness. The residue is recrystallised from methanol to obtain the 17-acetate of $\Delta^4$-6-methyl-17β-hydroxy-19-nor-androstene.

Analogously the butyrate, caproate, succinate and β-phenyl propionate are prepared by replacing the acetic acid anhydride used in the above process by an equivalent quantity of the acid anhydride in question.

Example II

After cooling to 0° C. 2.5 ml. of a chromic acid solution, prepared by dissolving 13.34 g. of chromic acid in 20 ml. of water and adding 13.5 ml. of concentrated sulphuric acid and by supplementing this solution after that with water to 50 ml., are added dropwise to a solution of 2.6 g. of $\Delta^4$-6-methyl-17β-hydroxy-19-nor-androstene.

The reaction mixture is stirred for 10 minutes, after which 8.5 ml. of methanol are added. The mixture is then poured into 250 ml. of ice water. This mixture is stirred for 30 minutes and after that filtered, after which the precipitate is washed until neutral and dried. By recrystallisation of it from methanol/water 2.2 g. of $\Delta^4$-6-methyl-17-keto-19-nor-androstene are obtained; melting point 96–97° C.

Example III

To a solution of 1 g. of the compound obtained in accordance with Example II in 25 ml. of dioxane a solution of potassium isopropylate in dioxane cooled to 0° C. is added with stirring in nitrogen atmosphere. Last-mentioned solution is prepared by adding 2.5 g. of potassium to 22 ml. of absolute isopropanol, followed by adding 10 ml. of dioxane. After that the nitrogen current is replaced by a current of acetylene gas, which is led through the solution for 2 hours, after which the reaction mixture is poured into 350 ml. of acidified ice water. The aqueous mixture is extracted with ether, the ether layer is separated and after that washed with a sodium carbonate solution, diluted sulphuric acid and finally with water until neutral. The ether layer is dried with sodium sulphate and after that evaporated to dryness. The residue is recrystallised from methanol/water to obtain the $\Delta^4$-6-methyl-17β-hydroxy-17α-ethynyl-19-nor-androstene.

To a solution of 0.8 g. of this compound in 5 ml. of pyridine 0.58 g. of undecylenic acid chloride is added dropwise at 0° C. The mixture is kept at room temperature for 10 hours and after that heated on a steam bath for 30 minutes. Then the mixture is cooled, poured into 35 ml. of ice water and extracted with ether. The ether extract is washed with 2 N hydrochloric acid, then with 1 N sodium hydroxide and finally evaporated to dryness. The residue is recrystallised from aqueous methanol to obtain the 17-undecylenate of $\Delta^4$-6-methyl-17β-hydroxy-17α-ethylnyl-19-nor-androstene.

Analogously the 17-hexahydrobenzoate, 17-undecylate, 17-oleate and the 17-cerotinate are obtained.

Example IV

To a solution of 1 g. of $\Delta^4$-6-methyl-17β-hydroxy-17α-ethynyl-19-nor-androstene in 75 ml. of ethanol, 120 g. of a 5% palladiumbarium sulphate catalyst are added, after which the solution is shaken in hydrogen atmosphere till 0.0033 mol. of hydrogen are taken up. The catalyst is then filtered and the filtrate evaporated to dryness in vacuo. The residue is recrystallised from methanol water to obtain the $\Delta^4$-6-methyl-17β-hydroxy-17α-vinyl-19-nor-androstene.

This compound is converted in the manners described in the Examples I and III into the 17-esters derived from propionic acid, caprylic acid, β-phenyl propionic acid, pentadecyclic acid and stearic acid.

In the manner described in this example, the $\Delta^4$-6-methyl-17β-hydroxy-17α-ethynyl-19-nor-androstene is hydrogenated by means of hydrogen in the presence of Pd-BaSo$_4$ (5%)-catalyst, till 0.0067 mol. of hydrogen is incorporated. There is obtained the $\Delta^4$-6-methyl-17β-hydroxy-17-ethyl-19-nor-androstene. In the manners described in the Examples I and III this compound is converted into the 17-esters thereof, derived from trimethyl acetic acid, cyclopentyl propionic acid and behenic acid.

Example V

To a mixture of 22.5 ml. of absolute ether in 1.85 g. of magnesium a mixture of 2.72 ml. of allyl bromide and 2.72 ml. of absolute ether are added in nitrogen atmosphere, after which a solution of 2.1 g. of Δ⁴-6-methyl-17-keto-19-nor-androstene, prepared in accordance with Example II, in 30 ml. of absolute ether are added. The reaction mixture is stirred for 4 hours and after that poured into acidified ice water. The aqueous mixture is extracted with ether, the ether layer is separated, washed with water, dried with sodium sulphate and evaporated to dryness. The residue is recrystallised from a mixture of water and methanol to obtain the Δ⁴-6-methyl-17β-hydroxy-17α-allyl-19-nor-androstene.

This compound is converted into the 17-butyrate, 17-myristinate, 17β-phenyl propionate and the 17-cyclohexyl butyrate in the manners described in the Examples I and III.

*Example VI*

To a solution of 1.2 g. of 6,17-dimethyl-19-nor-testosterone in 45 ml. of methanol, 0.55 g. of sodium borohydroxide is added at room temperature. The reaction mixture is kept at room temperature for 30 minutes, then neutralised with acetic acid and next evaporated in vacuo to a volume of 10 ml. The residue is poured into 75 ml. of water, after which the Δ⁴-3,17-dihydroxy-6,17-dimethyl-19-nor-androstene crystallises. The filtered precipitate is dissolved in 25 ml. of methanol, after which to this solution 2.8 ml. of 36% hydrochloric acid are added. The solution obtained is stirred at room temperature for one hour, after which the reaction mixture is neutralised with sodium bicarbonate and evaporated to 5 ml. The residue is poured into 40 ml. of water, after which the crystals of Δ⁴-3-methoxy-6,17-dimethyl-17β-hydroxy-19-nor-androstene obtained are sucked off and recrystallised from aqueous methanol.

Of this compound 1 g. is dissolved in 45 ml. of absolute ether, after which to this solution 40 ml. of liquid ammonia and then 0.3 g. of lithium cut into pieces, are added. The blue coloured solution is then stirred at −35° C. for 2 hours, after which at the same temperature 8 ml. of absolute ethanol are added. The ammonia is evaporated, the residue diluted with water and the mixture obtained extracted a few times with ether. The collected ether extracts are washed with water, dried with sodium sulphate and evaporated to dryness. The residue is recrystallised from aqueous methanol to obtain the Δ⁴-6,17α-dimethyl-17β-hydroxy-19-nor-androstene.

This compound is esterified into the 17-esters, derived from valeric acid, trimethyl acetic acid, β-phenyl propionic acid and succinic acid in the manners described in the Examples I and III.

In the same way the 6-methyl-17α-butyl-19-nor-testosterone is converted, in the manner described above into the corresponding compound non-oxygenated in 3-position.

We claim:
1. Steroids of the general formula:

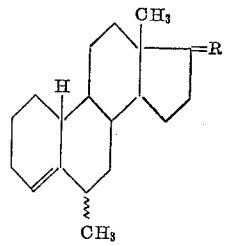

in which
R is selected from the group consisting of H(βOH), H(βOAcyl), O, βOH(X), and βOAcyl(X), in which
X is selected from the group consisting of a saturated and unsaturated aliphatic hydrocarbon radical with 1–4 carbon atoms.

2. Steroids of the general formula:

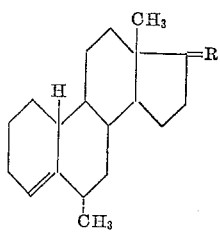

in which
R is selected from the group consisting of H(βOH), H(βOAcyl), O, βOH(X) and βOAcyl(X), in which
X is selected from the group consisting of a saturated and unsaturated aliphatic hydrocarbon radical with 1–4 carbon atoms.

3. A compound selected from the group consisting of Δ⁴ - 6α - methyl - 17β -hydroxy - 19 - nor - androstene and 17-esters thereof.

4. A compound selected from the group consisting of Δ⁴ - 6α - methyl - 17β - hydroxy - 17α - ethyl - 19 - nor-androstene and 17-esters thereof.

5. A compound selected from the group consisting of Δ⁴ - 6α - methyl - 17β - hydroxy - 17α - ethynyl - 19 - nor-androstene and 17-esters thereof.

6. A compound selected from the group consisting of Δ⁴ - 6α. - methyl - 17β - hydroxy - 17α - allyl - 19 - nor-androstene and 17-esters thereof.

References Cited in the file of this patent
UNITED STATES PATENTS

| | | |
|---|---|---|
| 2,939,819 | Barton et al. | June 7, 1960 |
| 2,966,503 | Szpilfogel | Dec. 27, 1960 |